(12) United States Patent
Adams et al.

(10) Patent No.: US 10,525,636 B2
(45) Date of Patent: Jan. 7, 2020

(54) PROCESS FOR FORMING A FIBER-REINFORCED COMPOSITE STRUCTURE

(71) Applicant: Rohr, Inc., Chula Vista, CA (US)

(72) Inventors: David M. Adams, San Diego, CA (US); Jeffrey Woods, Beaumont, CA (US); Luby Weaver, Redlands, CA (US); Randy A. Monton, San Jacinto, CA (US); Charles M. Biset, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 11 days.

(21) Appl. No.: 16/010,619

(22) Filed: Jun. 18, 2018

(65) Prior Publication Data

US 2018/0361684 A1    Dec. 20, 2018

Related U.S. Application Data

(60) Provisional application No. 62/521,828, filed on Jun. 19, 2017.

(51) Int. Cl.
    *B29C 70/34*    (2006.01)
    *B29C 33/30*    (2006.01)
    (Continued)

(52) U.S. Cl.
    CPC ............ *B29C 70/30* (2013.01); *B29C 33/302* (2013.01); *B29C 53/24* (2013.01); *B29C 53/42* (2013.01);
    (Continued)

(58) Field of Classification Search
    CPC ....... B29C 70/345; B29C 53/24; B29C 53/42; B29C 70/541; B29C 70/30; B29C 33/302;
    (Continued)

(56) References Cited

U.S. PATENT DOCUMENTS

| | | | | |
|---|---|---|---|---|
| 2,924,851 A | * | 2/1960 | Birckhead, Jr. | ....... B29C 33/302 249/141 |
| 3,380,206 A | | 4/1968 | Barnett et al. | |

(Continued)

FOREIGN PATENT DOCUMENTS

| | | | | |
|---|---|---|---|---|
| CN | 104723616 A | | 6/2015 | |
| DE | 102012018158 A1 | * | 4/2014 | ............... B32B 5/24 |

(Continued)

OTHER PUBLICATIONS

EP search report for EP18178646.8 dated Oct. 26, 2018.

*Primary Examiner* — William P Bell
(74) *Attorney, Agent, or Firm* — O'Shea Getz P.C.

(57) ABSTRACT

A process for manufacturing a composite structure includes: providing first mandrels, each first mandrel including a base and a plurality of projections arranged longitudinally along and projecting vertically out from the base; providing second mandrels; providing first ribbon plies, each first ribbon ply including a sheet of fibrous material; arranging each first ribbon ply with a respective first mandrel, the arranging of each first ribbon ply including substantially covering each surface of each of the projections of one of the first mandrels with a respective first ribbon ply; mating each second mandrel with a respective first mandrel such that each first ribbon ply is sandwiched between a respective first mandrel and a respective second mandrel; and curing resin disposed with the first ribbon plies to consolidate the first ribbon plies together and form a fiber-reinforced composite core structure of an acoustic panel.

20 Claims, 12 Drawing Sheets

(51) Int. Cl.
*B29C 70/30* (2006.01)
*B32B 27/20* (2006.01)
*B32B 37/18* (2006.01)
*B29D 24/00* (2006.01)
*B29C 53/24* (2006.01)
*B29C 53/42* (2006.01)
*B29D 99/00* (2010.01)
*B29L 31/30* (2006.01)
*B29C 70/54* (2006.01)

(52) U.S. Cl.
CPC .......... *B29C 70/345* (2013.01); *B29D 24/004* (2013.01); *B29D 24/008* (2013.01); *B29D 99/0014* (2013.01); *B32B 27/20* (2013.01); *B32B 37/182* (2013.01); *B29C 70/545* (2013.01); *B29C 2793/009* (2013.01); *B29C 2793/0045* (2013.01); *B29K 2995/0002* (2013.01); *B29L 2031/3076* (2013.01); *B32B 2307/102* (2013.01); *B32B 2605/18* (2013.01)

(58) Field of Classification Search
CPC .. B29D 24/001; B29D 24/002; B29D 24/004; B29D 24/005; B29D 24/008; B29D 99/0014; B29B 11/04
See application file for complete search history.

(56) References Cited

U.S. PATENT DOCUMENTS

| | | | |
|---|---|---|---|
| 3,452,152 A | 6/1969 | Schreiner et al. | |
| 3,639,106 A | 2/1972 | Yate et al. | |
| 3,734,234 A | 5/1973 | Wirt | |
| 3,821,999 A | 7/1974 | Guess et al. | |
| 3,850,261 A | 11/1974 | Hehmann et al. | |
| 3,910,374 A | 10/1975 | Holehouse | |
| 3,948,346 A | 4/1976 | Schindler | |
| 4,189,027 A | 2/1980 | Dean, III et al. | |
| 4,240,519 A | 12/1980 | Wynosky | |
| 5,114,775 A | 5/1992 | Gsell et al. | |
| 5,162,143 A * | 11/1992 | Porter | B29D 24/004 359/883 |
| 5,482,340 A | 1/1996 | Jensen et al. | |
| 5,693,166 A | 12/1997 | Crane | |
| 5,806,302 A | 9/1998 | Cariola et al. | |
| 5,902,535 A | 5/1999 | Burgess et al. | |
| 5,923,003 A | 7/1999 | Arcas et al. | |
| 5,997,985 A | 12/1999 | Clarke et al. | |
| 6,170,254 B1 | 1/2001 | Cariola | |
| 6,179,249 B1 | 1/2001 | Canadas | |
| 6,340,135 B1 | 1/2002 | Barton | |
| 6,371,240 B1 | 4/2002 | Hayes et al. | |
| 6,561,478 B2 | 5/2003 | Cundiff et al. | |
| 6,598,701 B1 | 7/2003 | Wood et al. | |
| 6,604,355 B1 | 8/2003 | Sternberger | |
| 6,871,725 B2 | 3/2005 | Johnson | |
| 7,124,856 B2 | 10/2006 | Kempton et al. | |
| 7,484,356 B1 | 2/2009 | Lair | |
| 7,784,283 B2 | 8/2010 | Yu et al. | |
| 7,814,658 B2 * | 10/2010 | Akishev | B21D 47/00 29/897.32 |
| 7,878,229 B2 | 2/2011 | Nakajima et al. | |
| 7,959,109 B2 | 6/2011 | Dasilva et al. | |
| 7,963,039 B2 | 6/2011 | Burnett et al. | |
| 7,963,362 B2 | 6/2011 | Lidoine | |
| 7,971,684 B2 | 7/2011 | Gantie et al. | |
| 8,025,122 B2 | 9/2011 | Gilcreest et al. | |
| 8,181,905 B2 | 5/2012 | McDonough et al. | |
| 8,236,222 B2 | 8/2012 | Henderson et al. | |
| 8,245,815 B2 | 8/2012 | Valleroy et al. | |
| 8,251,175 B1 | 8/2012 | Englert et al. | |
| 8,336,316 B2 | 12/2012 | Kirby | |
| 8,413,922 B2 | 4/2013 | Porte et al. | |
| 8,449,707 B2 | 5/2013 | Simmons et al. | |
| 8,469,309 B2 | 6/2013 | Stuart et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,740,137 B2 | 6/2014 | Vauchel et al. | |
| 8,763,751 B2 | 7/2014 | Starobinski et al. | |
| 8,776,946 B2 | 7/2014 | Todorovic | |
| 8,820,477 B1 | 9/2014 | Herrera et al. | |
| 8,876,042 B2 | 11/2014 | LaChapelle et al. | |
| 8,919,668 B2 | 12/2014 | Vauchel et al. | |
| 8,955,643 B2 | 2/2015 | Liu | |
| 9,003,810 B2 | 4/2015 | Porte et al. | |
| 9,021,848 B2 | 5/2015 | Leacock et al. | |
| 9,188,026 B2 | 11/2015 | Calder et al. | |
| 9,228,532 B2 | 1/2016 | Aten et al. | |
| 2010/0000667 A1 | 1/2010 | Funnell | |
| 2011/0100747 A1 * | 5/2011 | Hoetzeldt | G10K 11/16 181/290 |
| 2011/0121487 A1 | 5/2011 | Topping et al. | |
| 2011/0219599 A1 * | 9/2011 | Gonda | B21D 53/04 29/428 |
| 2013/0115429 A1 | 5/2013 | Valle | |
| 2013/0220435 A1 | 8/2013 | James | |
| 2013/0266772 A1 | 10/2013 | Fujii | |
| 2014/0034416 A1 | 2/2014 | Liu | |
| 2014/0349082 A1 | 11/2014 | Tien | |
| 2015/0107222 A1 | 4/2015 | Aten | |
| 2015/0110613 A1 | 4/2015 | Aten | |
| 2015/0267643 A1 | 9/2015 | Gonidec et al. | |
| 2015/0284945 A1 | 10/2015 | Tien | |
| 2015/0285144 A1 | 10/2015 | Todorovic et al. | |
| 2015/0308376 A1 | 10/2015 | James | |
| 2015/0308378 A1 | 10/2015 | Aten | |
| 2015/0328845 A1 | 11/2015 | Lockett et al. | |
| 2015/0367953 A1 | 12/2015 | Yu et al. | |
| 2016/0138259 A1 | 5/2016 | Hauptman et al. | |
| 2017/0297279 A1 | 10/2017 | Fiegl | |

FOREIGN PATENT DOCUMENTS

| | | | | |
|---|---|---|---|---|
| EP | 2604426 A1 | | 6/2013 | |
| FR | 1368577 A | * | 7/1964 | .......... B29D 24/004 |
| FR | 2201010 A5 | | 4/1974 | |
| GB | 1406844 A | | 9/1975 | |
| RU | 2413654 C2 | | 3/2011 | |
| WO | WO-2019040086 A1 | * | 2/2019 | .......... B29C 70/36 |

* cited by examiner

PROCESS FOR FORMING A FIBER-REINFORCED COMPOSITE STRUCTURE

CROSS-REFERENCE TO RELATED APPLICATIONS

This application claims priority to U.S. Provisional Patent Application No. 62/521,828 filed Jun. 19, 2017, which is hereby incorporated herein by reference in its entirety.

BACKGROUND

1. Technical Field

This disclosure relates generally to an acoustic panel and, more particularly, to a process for forming a fiber-reinforced composite panel.

2. Background Information

Various types of acoustic panels are known in the art. Such acoustic panels may be configured to attenuate noise generated by an aircraft propulsion system. In order to reduce weight, some acoustic panels may be made from fiber-reinforced composite materials. However, known processes for laying up fibrous material in molds are typically time consuming and require a high level of expertise. There is a need in the art therefore for improved processes for forming a fiber-reinforced composite panel.

SUMMARY OF THE DISCLOSURE

According to an aspect of the present disclosure, a process is provided for manufacturing a composite structure. During this process, a plurality of first mandrels are provided. Each of the first mandrels includes a base and a plurality of projections arranged longitudinally along and projecting vertically out from the base. A plurality of second mandrels are provided. A plurality of first ribbon plies are provided. Each of the first ribbon plies is configured from or otherwise includes a sheet of fibrous material. Each of the first ribbon plies are arranged with a respective one of the first mandrels. The arranging of each of the first ribbon plies includes substantially covering each surface of each of the projections of one of the first mandrels with a respective one of the first ribbon plies. Each of the second mandrels are mated with a respective one of the first mandrels such that each of the first ribbon plies is sandwiched between a respective one of the first mandrels and a respective one of the second mandrels. Resin disposed with the first ribbon plies are cured to consolidate the first ribbon plies together and form a fiber-reinforced composite core structure of an acoustic panel.

According to another aspect of the present disclosure, another process is provided for manufacturing a composite structure. During this process, a plurality of first mandrels are provided. Each of the first mandrels includes a plurality of projections that form a longitudinally extending corrugated surface. A plurality of second mandrels are provided. A plurality of first ribbon plies are provided. Each of the first ribbon plies is configured from or otherwise includes a sheet of fibrous material. One of the first ribbon plies includes a plurality of first tabs, a plurality of second tabs and a base laterally between the first tabs and the second tabs. Each of the first tabs is longitudinally aligned with a respective one of the second tabs. Each of the first ribbon plies are arranged with a respective one of the first mandrels. The arranging of each of the first ribbon plies includes: covering the corrugated surface of one of the first mandrels with the base; covering a first side surface of each of the projections of the one of the first mandrels with a respective one of the first tabs; and covering a second side surface of each of the projections of the one of the first mandrels with a respective one of the second tabs. Each of the second mandrels is mated with a respective one of the first mandrels such that each of the first ribbon plies is between a respective one of the first mandrels and a respective one of the second mandrels. Resin disposed with the first ribbon plies is cured to consolidate the first ribbon plies together and form a fiber-reinforced composite core structure.

The respective one of the first ribbon plies may substantially cover each surface of each of the projections of the one of the first mandrels without any portion of the respective one of the first ribbon plies overlapping another portion of the respective one of the first ribbon plies.

The process may also include: providing a plurality of second ribbon plies, each of the second ribbon plies comprising a sheet of fibrous material; and arranging each of the second ribbon plies with a respective one of the second mandrels. Each of the second mandrels may include a second base and a plurality of second projections arranged longitudinally along and projecting vertically out from the second base. The arranging of each of the second ribbon plies may include substantially covering each surface of each of the second projections of one of the second mandrels with a respective one of the second ribbon plies. Each of the second ribbon plies and a respective one of the first ribbon plies may be sandwiched between a respective one of the first mandrels and a respective one of the second mandrels during the mating. The resin may be further disposed with the second ribbon plies. The curing of the resin may consolidate the second ribbon plies with the first ribbon plies.

The process may also include: providing a plurality of sidewall plies, each of the sidewall plies comprising a sheet of fibrous material; and arranging at least one of the sidewall plies between each adjacent pair of the first mandrels. The resin may be further disposed with the sidewall plies. The curing of the resin may consolidate the sidewall plies with the first ribbon plies.

The sidewall plies may include a plurality of first sidewall plies and a plurality of second sidewall plies. The process may also include: arranging each of the first sidewall plies on a first side of each of the first mandrels such that each of the first sidewall plies is abutted against and overlaps a first side portion of a respective one of the first ribbon plies; and arranging each of the second sidewall plies on a second side of each of the first mandrels such that each of the second sidewall plies is abutted against and overlaps a second side portion of a respective one of the first ribbon plies.

Each of the first mandrels may be configured with a first shelf formed by a first side edge surface of the base and first sides of the projections. The first shelf of each of the first mandrels may receive a respective one of the sidewall plies.

Each of the first mandrels may be further configured with a second shelf formed by a second side edge surface of the base and second sides of the projections. The second shelf of each of the first mandrels may receive a respective one of the sidewall plies.

The process may also include: providing a perimeter ply comprising a sheet of fibrous material; and wrapping the perimeter ply around a periphery of at least two of the first mandrels. The resin may be further disposed with the perimeter ply. The curing of the resin may consolidate the perimeter ply with the first ribbon plies.

The projections of one of the first mandrels may be arranged longitudinally along a non-straight longitudinal axis.

At least one of the projections of the one of the first mandrels may be configured as a wedge-shaped projection.

At least one of the projections of the one of the first mandrels may be configured with a triangular sectional geometry.

The respective one of the first ribbon plies may include a plurality of first tabs, a plurality of second tabs and a base laterally between the first tabs and the second tabs. Each of the first tabs may be longitudinally aligned with a respective one of the second tabs.

One of the first tabs and a respective one of the second tabs may be longitudinally aligned with the one of the first tabs each have a triangular shape.

A first adjacent pair of the first tabs may be separated by a longitudinal distance.

The respective one of the first ribbon plies may include a generally hexagonal shaped portion disposed at a longitudinal end of the base.

The fiber-reinforced composite core structure may include a plurality of septums. The process may include forming one or more perforations in each of the septums.

The fiber-reinforced composite core structure may include a plurality of baffles and a plurality of sidewalls. A first sub-cavity may be formed longitudinally between a first of the baffles and a first of the septums, and laterally between a first of the sidewalls and a second of the sidewalls. A second sub-cavity may be formed longitudinally between a second of the baffles and the first of the septums, and laterally between the first of the sidewalls and the second of the sidewalls. The first sub-cavity may be fluidly coupled with the second sub-cavity by the one or more perforations in the first of the septums.

The process may also include: arranging the fiber-reinforced composite core structure between a first skin and a second skin; and bonding the fiber-reinforced composite core structure to the first skin and the second skin. Each of the septums, each of the baffles and each of the sidewalls may extend vertically between the first skin and the second skin.

The process may also include forming a plurality of perforations in the first skin. One or more of the perforations in the first skin may be fluidly coupled with the first sub-cavity.

The foregoing features and the operation of the invention will become more apparent in light of the following description and the accompanying drawings.

DETAILED DESCRIPTION

The present disclosure includes processes for manufacturing a composite structure such as an acoustic panel for attenuating noise. Such an acoustic panel may be configured to attenuate noise generated by an aircraft propulsion system such as, for example, a turbofan propulsion system or a turbojet propulsion system. With this configuration, the acoustic panel may be included with a nacelle of the propulsion system. The acoustic panel, for example, may be configured as or with an inner or outer barrel, a translating sleeve of a thrust reverser, a blocker door, etc. Alternatively, the acoustic panel may be configured with another component/structure of the aircraft such as its fuselage or a wing. Furthermore, the acoustic panel may be configured to also or alternatively attenuate aircraft related noise other than that generated by the propulsion system. The acoustic panel of the present disclosure, however, may alternatively be configured for non-aircraft applications.

Figure 1:
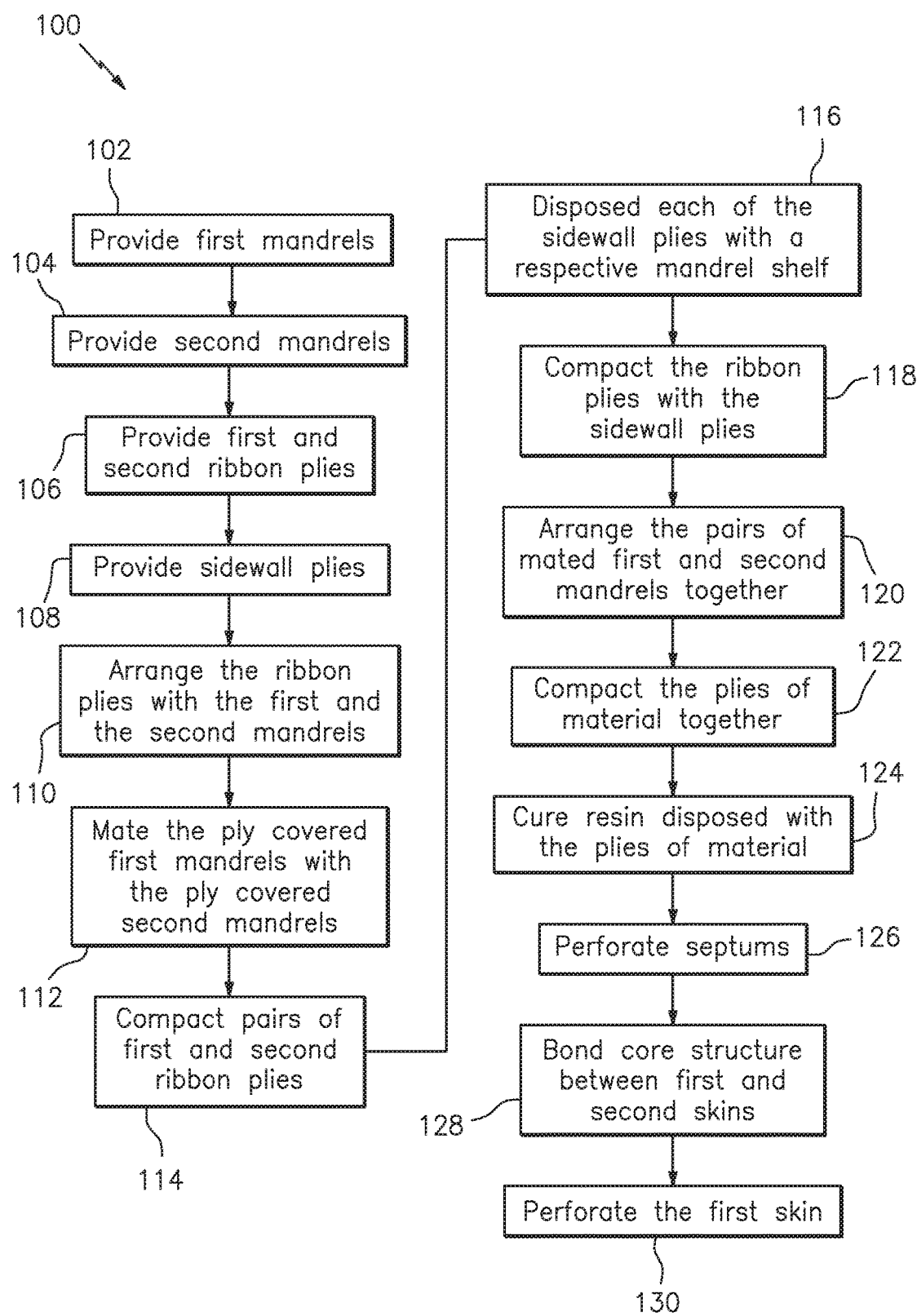
FIG. 1 is a flow diagram of an exemplary process for manufacturing a composite structure, in accordance with various embodiments.

FIG. 1 is a flow diagram of an exemplary process 100 for manufacturing the composite structure. Exemplary embodiments of such a composite structure (e.g., the acoustic panel) are described below with referenced to FIG. 20. However, the process 100 of the present disclosure is not limited to manufacturing such exemplary composite structures.

Figure 2:
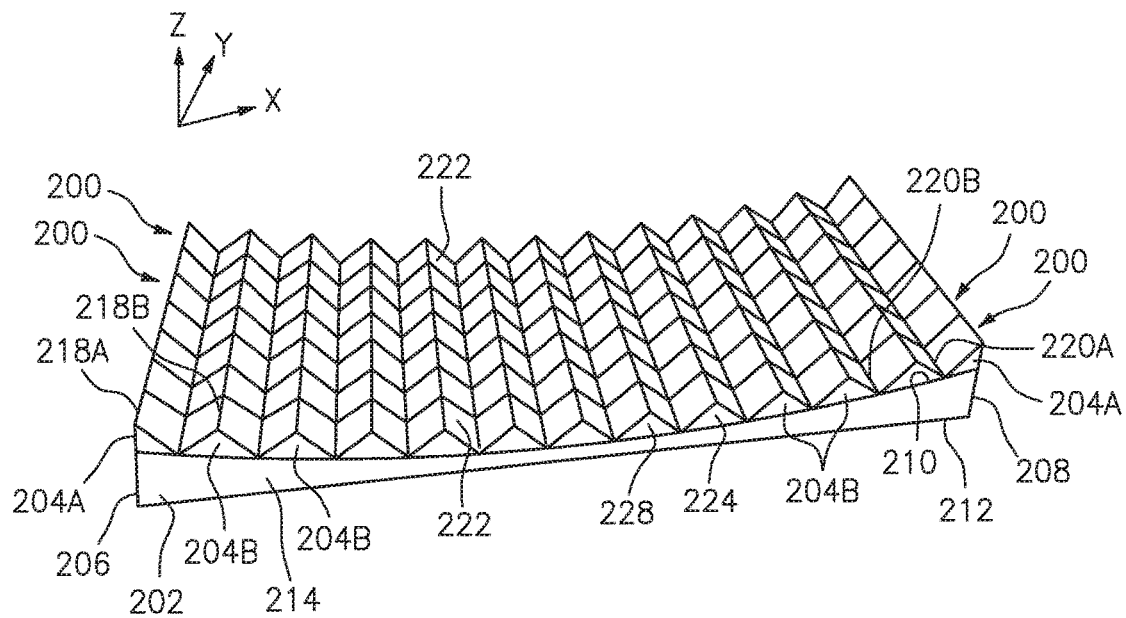
FIG. 2 is a perspective illustration of an array of first mandrels, in accordance with various embodiments.
Figure 3:
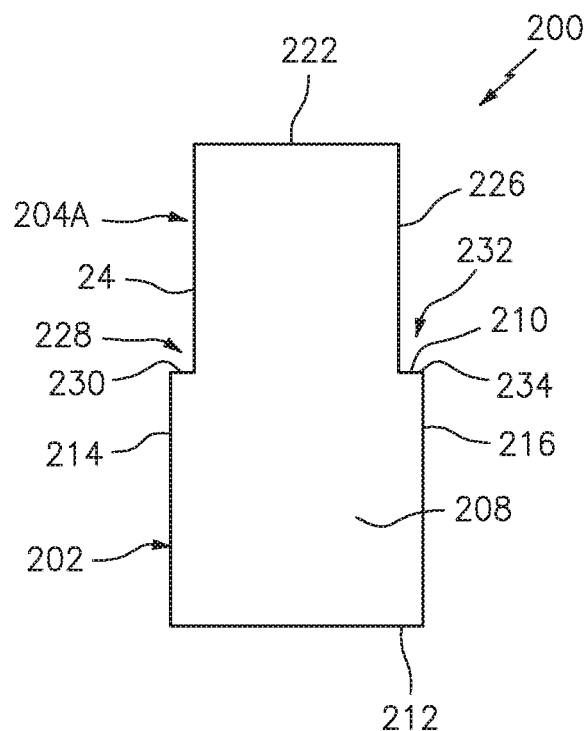
FIG. 3 is an end view illustration of one of the first mandrels, in accordance with various embodiments.

In step 102, one or more first (e.g., base or bottom) mandrels 200 are provided. An exemplary array of such first mandrels 200 is shown in FIG. 2. Each of these first mandrels 200 includes a base 202 and a plurality of projections 204A and 204B (generally referred to as "204"). The base 202 extends longitudinally (e.g., along an x-axis) between a first mandrel end 206 and an opposing second mandrel end 208. The base 202 extends vertically (e.g., along a z-axis) between a top base side 210 and an opposing bottom base side 212. Note, the terms "top" and "bottom" are used herein to describe sides of an element (here the base 202) as situated in the drawings and are not intended to limit the element to such an exemplary gravitational orientation. Referring now to FIG. 3, the base 202 extends laterally (e.g., along a y-axis) between a first base side surface 214 and an opposing second base side surface 216.

Referring again to FIG. 2, the projections 204 are arranged in a longitudinally extending array. More particularly, the projections 204 are arranged longitudinally along the base 202, where each of the projections 204 may directly longitudinally abut one or more adjacent projections 204. Each of the projections 204 projects vertically out from the top base side 210 to a respective peak 218A, 218B (generally referred to as "218"). Each longitudinally adjacent pair of the projections 204 forms a valley/trough 220A, 220B (generally referred to as "220") longitudinally therebetween. With this configuration, the projections 204 form a longitudinally extending corrugated surface 222 at a top end of the respective first mandrel 200.

Referring to FIG. 3, each of the projections 204 extends laterally between a first projection side surface 224 and a second projection side surface 226. Each first projection side surface 224 may be recessed inward from the first base side surface 214 so as to form a first shelf 228. This first shelf 228 of FIG. 3 is defined laterally by the first projection side surfaces 224 and vertically by a top first side edge surface 230 of the base 202. The first shelf 228 extends longitudinally between the first mandrel end 206 and the second mandrel end 208 (see FIG. 2). Similarly, each second projection side surface 226 may be recessed inward from the second base side surface 216 so as to form a second shelf 232. This second shelf 232 of FIG. 3 is defined laterally by the second projection side surfaces 226 and vertically by a top second side edge surface 234 of the base 202. The second shelf 232 extends longitudinally between the first mandrel end 206 and the second mandrel end 208.

Figure 5:
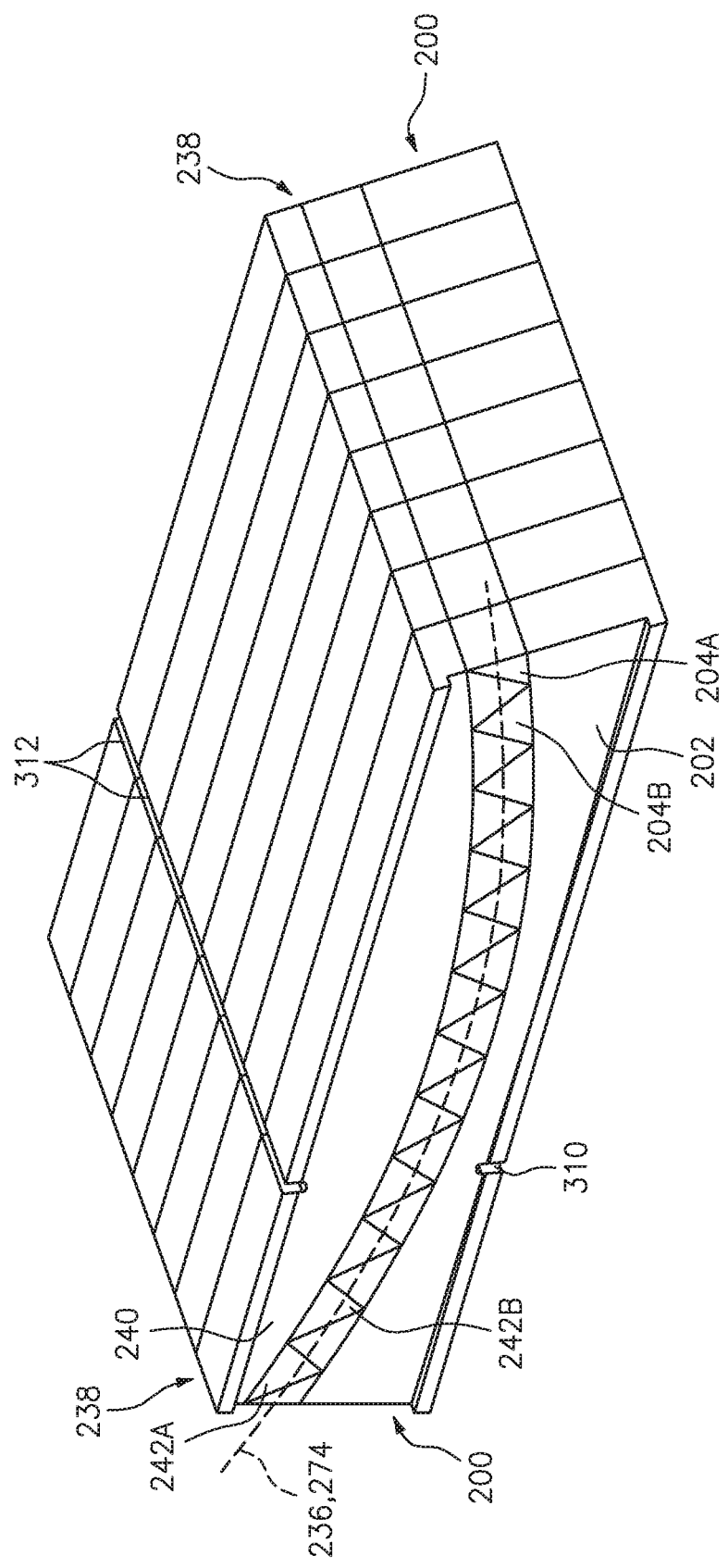
FIG. 5 is a perspective illustration of the array of first mandrels mated with the array of second mandrels, in accordance with various embodiments.

In the embodiment shown in FIG. 5, the projections 204 are arranged along a non-straight (e.g., curved) longitudinal axis 236. The top base side 210, for example, may follow an arcuate curve. However, in other embodiments, the projections 204 may be arranged along a substantially straight longitudinal axis.

Each of the projections 204 of FIG. 2 is configured as a wedge shaped projection. For example, each of the projections 204 is configured with a triangular sectional geometry when viewed in a longitudinal-vertical (e.g., x-z axes) plane. The middle or intermediate projections 204B may have substantially the same triangular sectional geometry; e.g., a right and/or isosceles triangular sectional geometry with its right angle at the peak 218B. The end projections 204A may have substantially the same triangular sectional geometry; e.g., right and/or isosceles triangular sectional geometry with its right angle at the respective mandrel end 206, 208. The present disclosure, however, is not limited to the exemplary first mandrel configurations described above. For example, in other embodiments, one or more of the projections 204 may have an alternative sectional geometry; e.g., semi-circular, semi-elliptical, etc. In another example, one or more of the projections 204 may be longitudinally spaced from an adjacent one of the projections 204.

Each first mandrel 200 may be formed as a monolithic body. Each first mandrel 200 may be formed from a material such as, but not limited to, metal.

Figure 4:
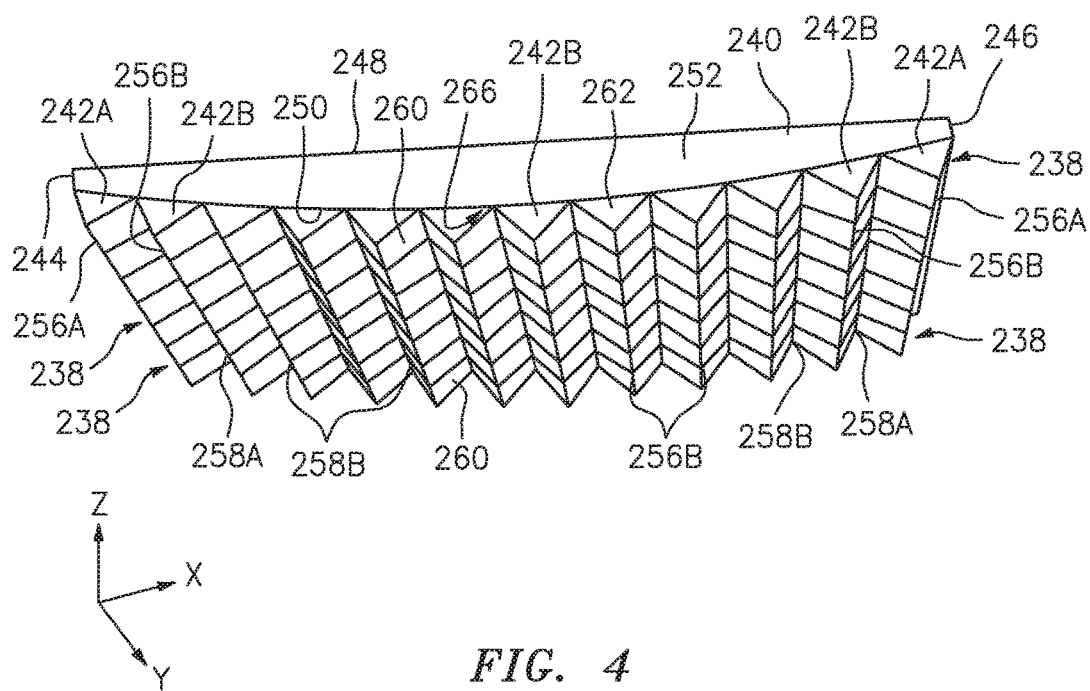
FIG. 4 is a perspective illustration of an array of second mandrels, in accordance with various embodiments.
Figure 6:
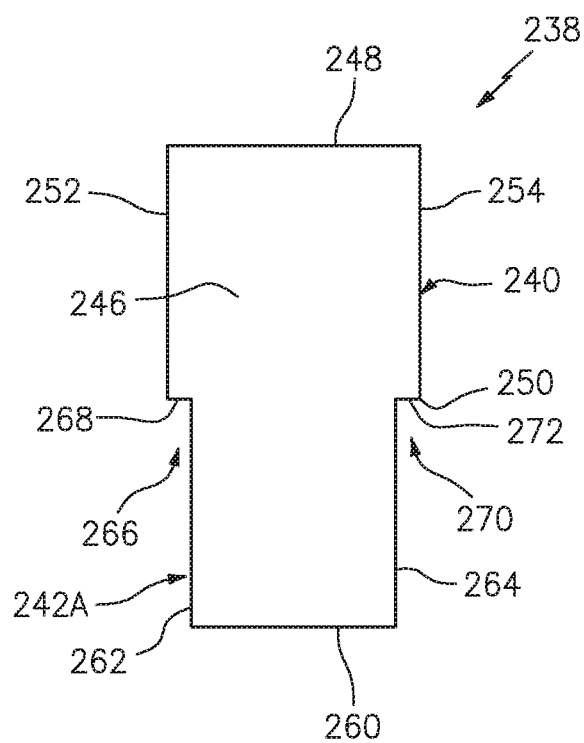
FIG. 6 is an end view illustration of one of the second mandrels, in accordance with various embodiments.

In step 104, one or more second (e.g., cap or top) mandrels 238 are provided. An exemplary array of such second mandrels 238 is shown in FIG. 4. Each of these second mandrels 238 may be uniquely associated with and configured to mate with and complement a respective one of the first mandrel 200; e.g., see FIG. 5. Referring again to FIG. 4, each of the second mandrels 238 includes a base 240 and a plurality of projections 242A and 242B (generally referred to as "242"). The base 240 extends longitudinally between a first mandrel end 244 and an opposing second mandrel end 246. The base 240 extends vertically between a top base side 248 and an opposing bottom base side 250. Referring now to FIG. 6, the base 240 extends laterally between a first base side surface 252 and an opposing second base side surface 254.

Referring again to FIG. 4, the projections 242 are arranged in a longitudinally extending array. More particularly, the projections 242 are arranged longitudinally along the base 240, where each of the projections 242 may directly longitudinally abut one or more adjacent projections 242. Each of the projections 242 projects vertically out from the bottom base side 250 to a respective peak 256A and 256B (generally referred to as "256"). Each longitudinally adjacent pair of the projections 242 forms a valley/trough 258A and 258B (generally referred to as "258") longitudinally therebetween. With this configuration, the projections 242 form a longitudinally extending corrugated surface 260 at a bottom end of the respective second mandrel 238.

Referring to FIG. 6, each of the projections 242 extends laterally between a first projection side surface 262 and a second projection side surface 264. Each first projection side surface 262 may be recessed inward from the first base side surface 252 so as to form a first shelf 266. This first shelf 266 of FIG. 6 is defined laterally by the first projection side surfaces 262 and vertically by a bottom first side edge surface 268 of the base 240. The first shelf 266 extends longitudinally between the first mandrel end 244 and the second mandrel end 246 (see FIG. 4). Similarly, each second projection side surface 264 may be recessed inward from the second base side surface 254 so as to form a second shelf 270. This second shelf 270 of FIG. 3 is defined laterally by the second projection side surfaces 264 and vertically by a bottom second side edge surface 272 of the base 240. The second shelf 270 extends longitudinally between the first mandrel end 244 and the second mandrel end 246.

In the embodiment shown in FIG. 4, the projections 242 are arranged along a non-straight (e.g., curved) longitudinal axis 274 (see FIG. 5). The bottom base side 250, for example, may follow an arcuate curve. However, in other embodiments, the projections 242 may be arranged along a substantially straight longitudinal axis.

Each of the projections 242 of FIG. 4 is configured as a wedge shaped projection. For example, each of the projections 242 is configured with a triangular sectional geometry when viewed in a longitudinal-vertical (e.g., x-z axes) plane. The middle or intermediate projections 242B may have substantially the same triangular sectional geometry; e.g., a right and/or isosceles triangular sectional geometry with its right angle at the peak 256B. The end projections 242A may have substantially the same triangular sectional geometry, which may be the same as the middle projections 242B. The present disclosure, however, is not limited to the exemplary second mandrel configurations described above. For example, in other embodiments, one or more of the projections 242 may have an alternative sectional geometry; e.g., semi-circular, semi-elliptical, etc. In another example, one or more of the projections 242 may be longitudinally spaced from an adjacent one of the projections 242.

Each second mandrel 238 may be formed as a monolithic body. Each second mandrel 238 may be formed from a material such as, but not limited to, metal.

Figure 7:
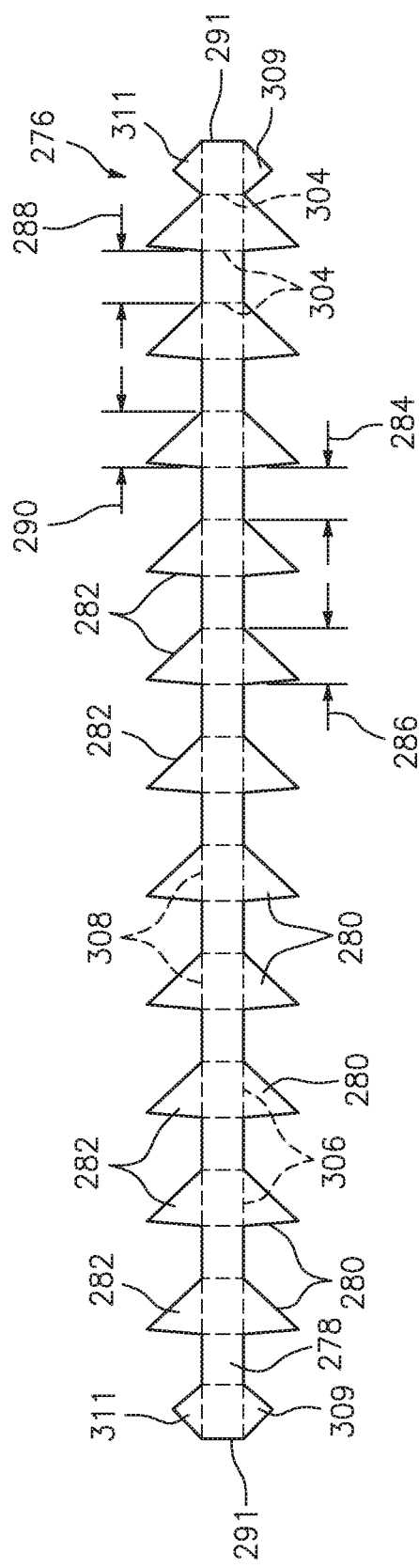
FIG. 7 is an illustration of ribbon ply, in accordance with various embodiments.
Figure 14:
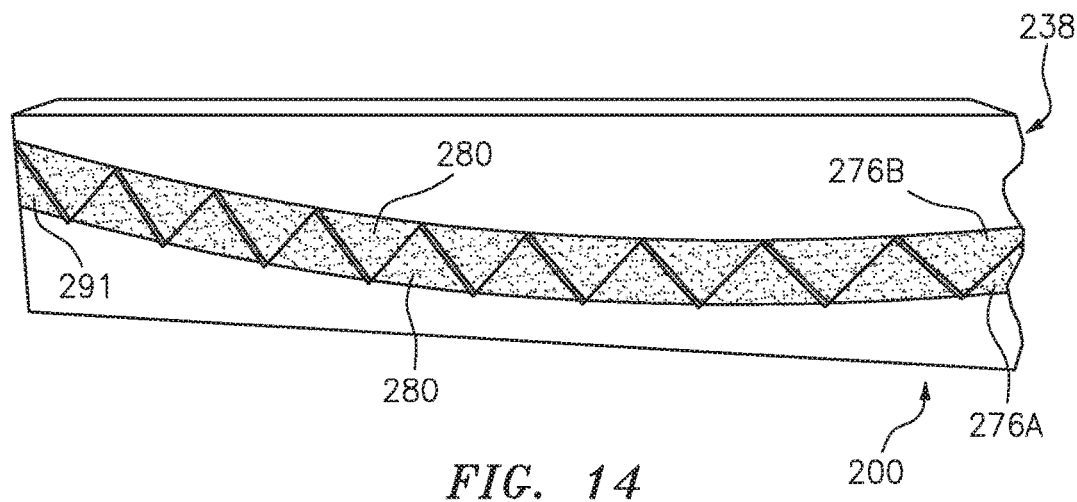
FIG. 14 is a partial illustration of a ply covered first mandrel mated with a ply covered second mandrel, in accordance with various embodiments.
Figure 15:
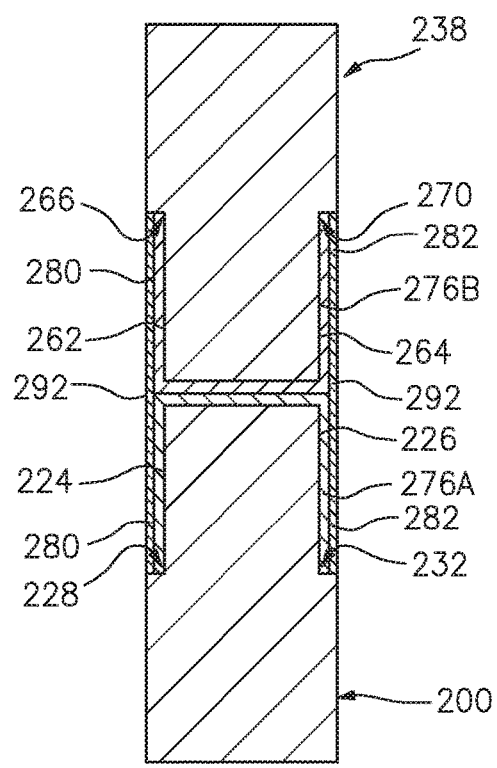
FIG. 15 is a cross-sectional illustration of ply covered and mated mandrels arranged with a pair of sidewall plies, in accordance with various embodiments.

In step 106, a plurality of first and second ribbon plies 276A and 276B (generally referred to as "276") are provided; see also FIGS. 14 and 15. An exemplary embodiment of such ribbon plies is illustrated in FIG. 7. This exemplary ribbon ply 276 is made from a continuous/uninterrupted sheet of (e.g., woven) fibrous material. Examples of such fibrous material include, but are not limited to, fiber glass fibers, carbon fibers, aramid (e.g., Kevlar®) fibers or a combination of two or more thereof. The ribbon ply 276 may also include resin; e.g., the fibrous material may be prepreg (pre-resin impregnated) material. However, in other embodiments, the resin may be introduce via an injection method after the ribbon plies 276 are already laid up with the mandrels.

The ribbon ply 276 of FIG. 7 is cut to have a barbed configuration. The ribbon ply 276 of FIG. 7, for example, includes a ribbon ply base 278, a plurality of first tabs 280 and a plurality of second tabs 282. The ribbon ply base 278 is laterally between the first tabs 280 and the second tabs 282, where each tab projects out from the base 278.

The first tabs 280 are arranged longitudinally along a first side of the ribbon ply base 278, where each adjacent pair of the first tabs 280 may be separated by a non-zero longitudinal distance 284. This longitudinal distance 284 may be substantially equal to (or greater than or less than) a longitudinal width 286 of the first tab 280. Each of the first tabs 280 may have a triangular shape; however, the present disclosure is not limited thereto.

The second tabs 282 are arranged longitudinally along a second side of the ribbon ply base 278, where each adjacent pair of the second tabs 282 may be separated by a non-zero longitudinal distance 288. This longitudinal distance 288 may be substantially equal to (or greater than or less than) a longitudinal width 290 of the second tab 282. Each of the second tabs 282 may be longitudinally aligned with a respective one of the first tabs 280, thus the width 288 may be substantially equal to the width 284. Each of the second tabs 282 may have a triangular shape; however, the present disclosure is not limited thereto.

The ribbon ply 276 (e.g., each of the first ribbon plies 276A, but not the second ribbon plies 276B) may also include one or more end portions 291. Each end portion 291 of FIG. 7 is configured as a generally hexagonal shaped portion. Each end portion 291 is disposed at a respective longitudinal end of the ribbon ply base 278. Of course, in other embodiments, the ribbon ply 276 may only include a single end portion 291.

In general, each of the ribbon plies 276 may have a unique configuration that is specifically tailored to the mandrel 200, 238 that ply is to be arranged with where the structure being formed is three-dimensionally (3D) curved. In this manner, the ribbon plies 276 may be cut (before arranging them with the mandrels) in such a manner that further trimming of the fibrous material is not required.

Figure 8:
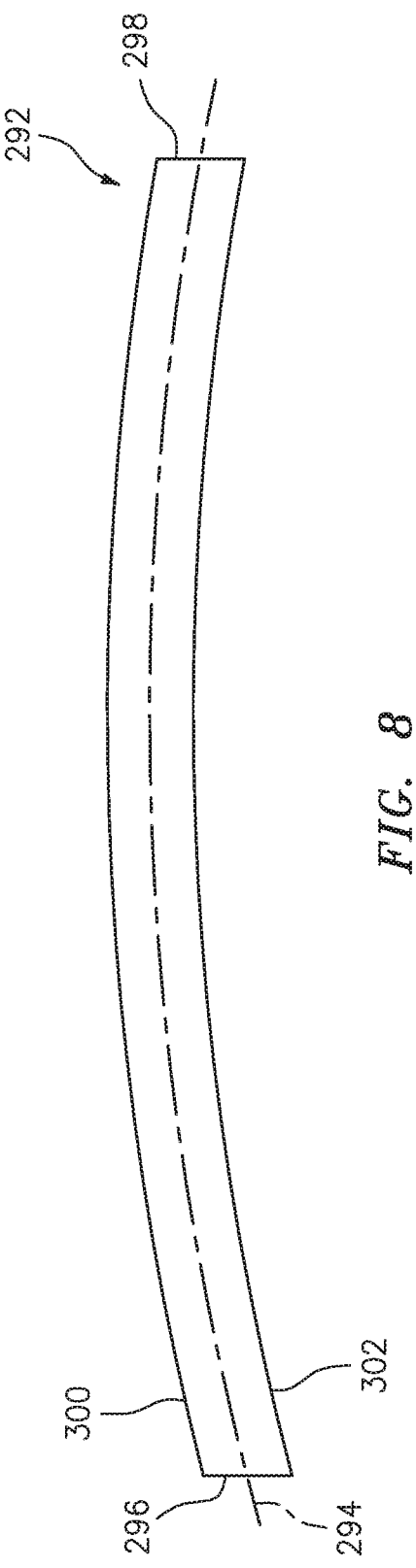
FIG. 8 is an illustration of a sidewall ply, in accordance with various embodiments.

In step 108, a plurality of sidewall plies 292 are provided. An exemplary embodiment of such sidewall plies 292 is illustrated in FIG. 8. This exemplary sidewall ply 292 is made from a continuous/uninterrupted sheet of (e.g., woven) fibrous material. Examples of such fibrous material include, but are not limited to, fiber glass fibers, carbon fibers, aramid (e.g., Kevlar®) fibers or a combination of two or more thereof. The sidewall ply 292 may also include resin; e.g., the fibrous material may be prepreg (pre-resin impregnated) material. However, in other embodiments, the resin may be introduce via an injection method after the plies 292 are already laid up with the mandrels.

The sidewall ply 292 extends longitudinally along a longitudinal centerline 294 between a first sidewall ply end 296 and an opposing second sidewall ply end 298. This longitudinal centerline 294 may be substantially identical to the longitudinal centerline 236, 274 of a respective one of the mandrels 200, 238; e.g., see FIG. 5. The sidewall ply 292 extends vertically between a top sidewall ply side 300 and an opposing bottom sidewall ply side 302.

In step 110, each of the ribbon plies 276 is arranged with a respective one of the mandrels 200, 238. More particularly, each of the first ribbon plies 276A is arranged with a respective one of the first mandrels 200. Each of the second ribbon plies 276B is arranged with a respective one of the second mandrels 238.

Figure 9:
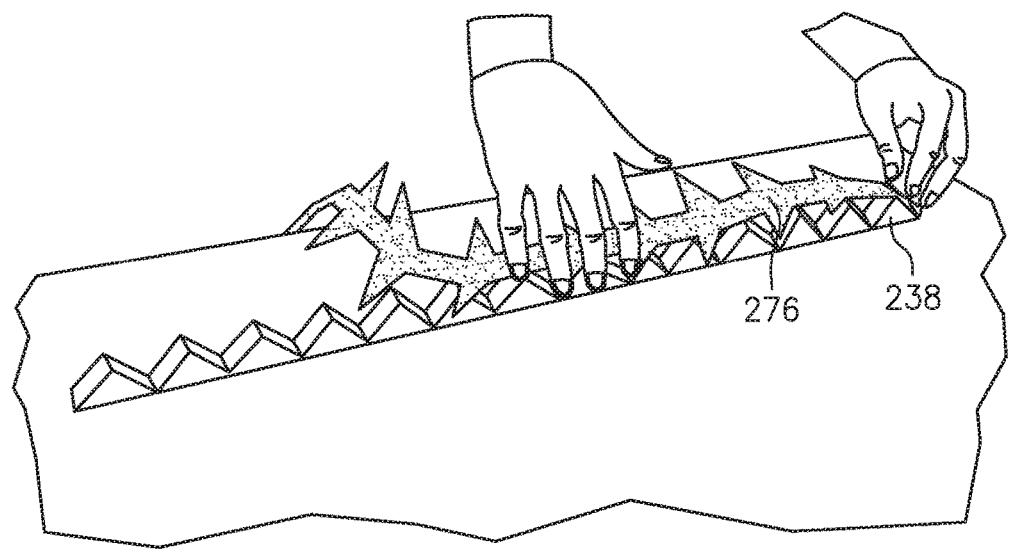
FIGS. 9-11 illustrate a sequence for arranging a ribbon ply with a respective mandrel, in accordance with various embodiments.
Figure 10:
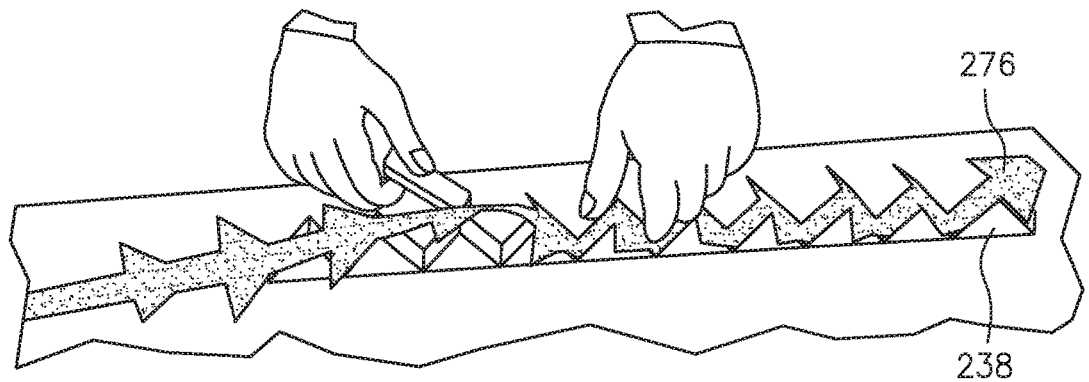
Figure 11:
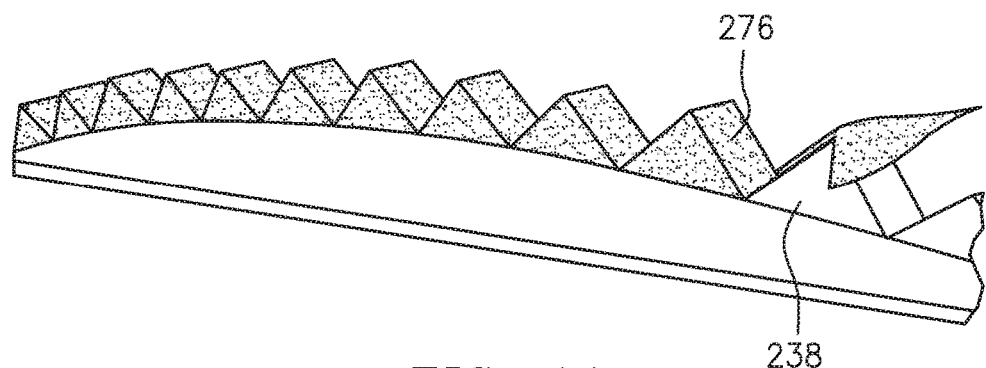

An exemplary embodiment of this arranging step is shown in the sequence of FIGS. 9-11. During this exemplary arranging step, the ribbon ply base 278 is folded along a plurality of fold lines 304 (see FIG. 7) such that the ribbon ply base 278 (e.g., substantially completely) covers and follows the corrugated surface 222, 260 of a respective mandrel 200, 238. The tabs 280 and 282 are also folded along a plurality of fold lines 306 and 308 (see FIG. 7) such that each of the tabs 280, 282 (e.g., substantially completely) covers a respective one of the side surfaces 224, 226, 262, 264 of a respective one of the projections 204B, 242B. Furthermore, tabs 309 and 311 of the end portions 291 are folded such that each tab (e.g., substantially completely) covers a respective one of the side surfaces 224, 226 of a respective one of the projections 204A. Notably, the configuration (e.g., perimeter shape) of the ribbon ply 276 may be specifically tailored to the mandrel 200, 238 such no portion of the ribbon ply 276 overlaps another portion of the ribbon ply 276.

Figure 12:
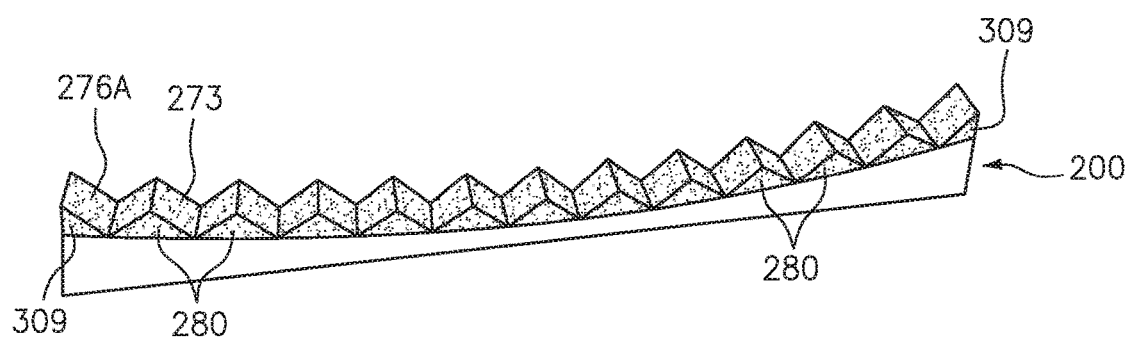
FIG. 12 is a perspective illustration of a first ribbon ply arranged with a respective one of the first mandrels, in accordance with various embodiments.
Figure 13:
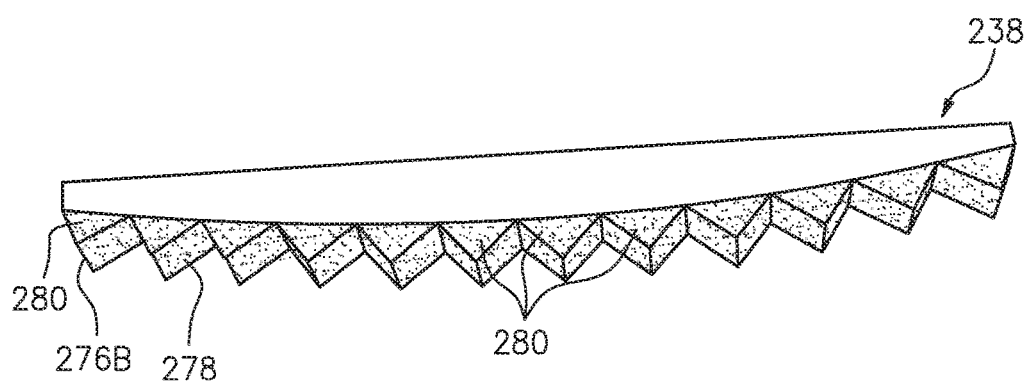
FIG. 13 is a perspective illustration of a second ribbon ply arranged with a respective one of the second mandrels, in accordance with various embodiments.

The foregoing exemplary arranging step is repeated for each of the first ribbon plies 276A and each of the second ribbon plies 276B. FIG. 12 illustrates an exemplary one of the first ribbon plies 276A arranged with a respective one of the first mandrels 200. FIG. 13 illustrates an exemplary one of the second ribbon plies 276B arranged with a respective one of the second mandrels 238.

In step 112, each of the ply covered second mandrels 238 is mated with a respective one of the ply covered first mandrels 200 as shown in FIG. 14. Once mated, each of the first ribbon plies 276A and a respective one of the second ribbon plies 276B is sandwiched between a respective one of the first mandrels 200 and a respective one of the second mandrels 238; see also FIG. 15.

In step 114, the first and second ribbon plies 276 may be compacted against the respective first and second mandrels 238. Such a compaction may be performed, for example, in a vacuum bag and/or using any other known compaction methodologies.

In step 116, each of the sidewall plies 292 is disposed in a respective one of the shelves 228, 232, 266, 270 as shown in FIG. 15. In the embodiment of FIG. 15, each set of mandrels 200 and 238 receives two of the sidewall plies 292, where each sidewall ply 292 is abutted against and overlaps a respective side portion of the ribbon plies 276A and 276B.

However, in other embodiments, each set of the mandrels 200 and 238 may receive a single sidewall ply or more than two sidewall plies.

In step 118, the sidewall plies 292 may be compacted with the respective ribbon plies 276 and the respective first and second mandrels 238. Such a compaction may be performed, for example, in a vacuum bag and/or using any other known compaction methodologies.

In step 120, the pairs of first and second mandrels 238 are arranged together as generally shown in FIG. 5. It is worth noting, the plies of material are not shown in FIG. 5 for easy of illustration. The mandrels 200, 238 may be aligned with one another by aligning first channels 310 in the first mandrels 200 and aligning second channels 312 in the second mandrels 238. A key (not shown) may be placed in the aligned first channels 310 and a key (not shown) may be placed in the aligned second channels 312 to lock the mandrels 200, 238 together.

In step 122, the plies of material and the grouping of mandrels 200, 238 may be compacted. Such a compaction may be performed, for example, in a vacuum bag and/or using any other known compaction methodologies.

In step 124, the resin disposed with the plies of fibrous material may be cured under elevated heat and pressure. This curing consolidates the fibrous material together and thereby forms a fiber-reinforced composite core structure 314.

Figure 16:
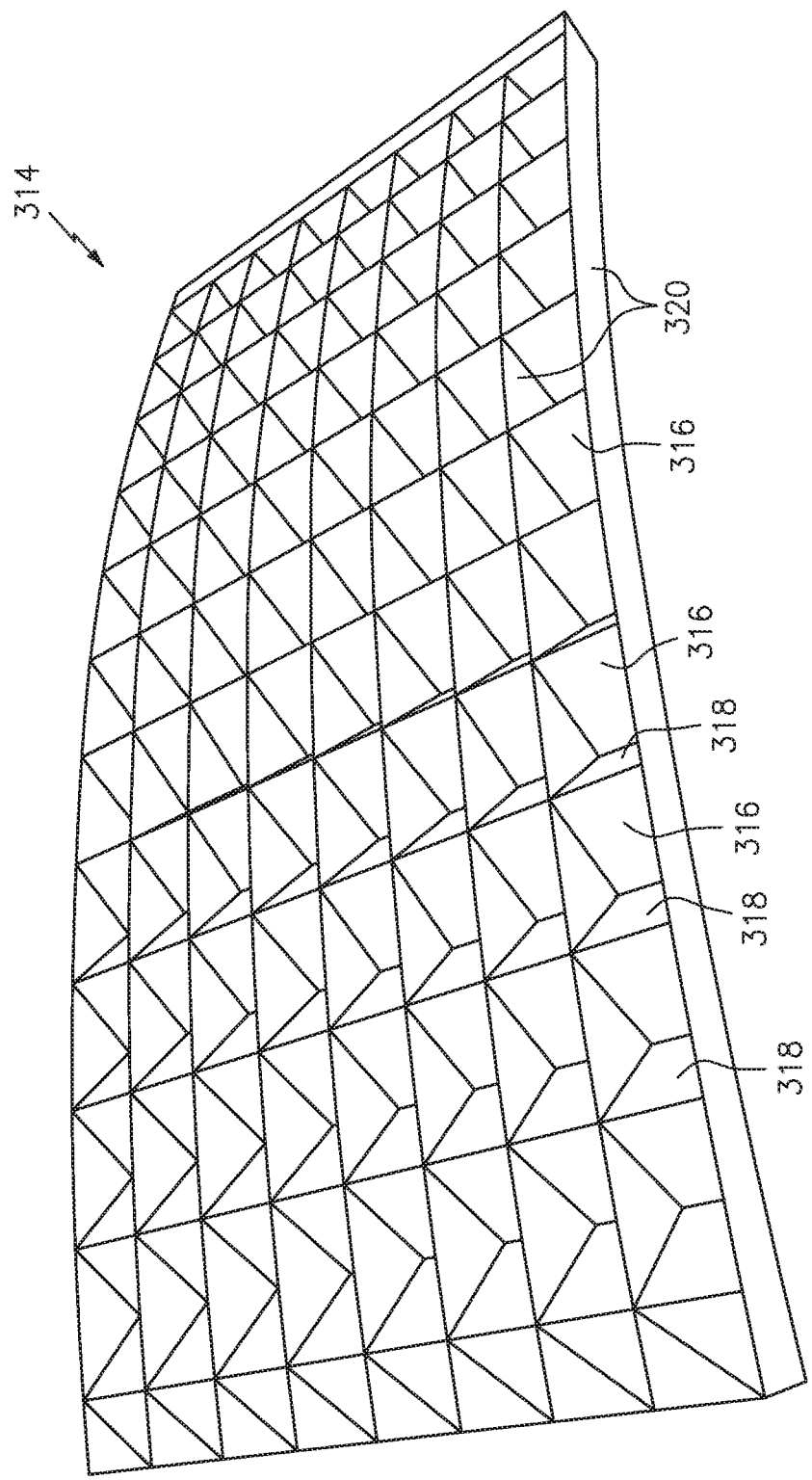
FIG. 16 is a perspective illustration of a fiber-reinforced composite core structure, in accordance with various embodiments.

An exemplary embodiment of the fiber-reinforced composite core structure 314 is illustrated in FIG. 16. This core structure 314 includes a plurality of septums 316, a plurality of baffles 318 and a plurality of sidewalls 320. The septums 316 and the baffles 318 are formed by the consolidated ribbon ply bases 278. The sidewalls 320 are formed by the consolidated ribbon ply tabs 280 and 282 and sidewall plies 292.

The septums 316 and the baffles 318 are arranged in a plurality of arrays. Each of these arrays is disposed between a respective laterally adjacent pair of the sidewalls 320. Thus, each of the septums 316 and each of the baffles 318 in each array extends laterally between a respective laterally adjacent pair of the sidewalls 320. Similarly, each of the sidewalls 320 is disposed between a respective laterally adjacent pair of the arrays of septums 316 and baffles 318.

Figure 17:
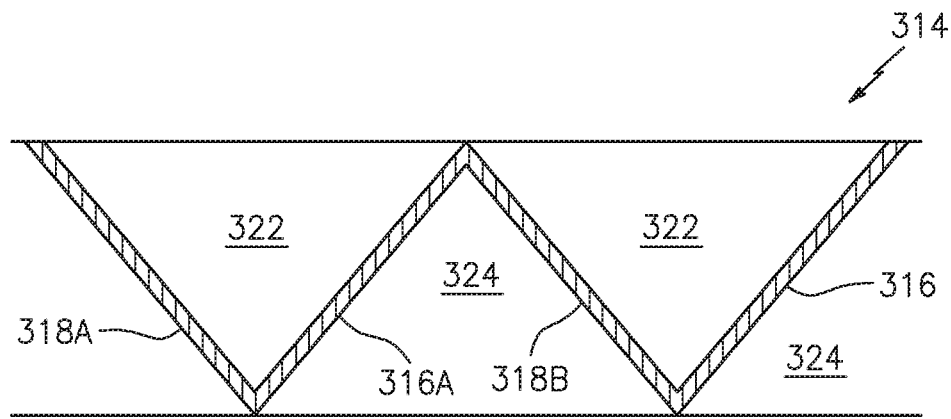
FIG. 17 is a partial sectional illustration of the core structure, in accordance with various embodiments.

Referring to FIG. 17, the core structure 314 includes a plurality of first sub-cavities 322 and a plurality of second sub-cavities 324. Each first sub-cavity 322 extends longitudinally between one of the baffles 318 (e.g., baffle 318A) and one of the septums 316 (e.g., septum 316A). Each first sub-cavity 322 extends laterally between an adjacent pair of the sidewalls 320 (e.g., see FIG. 17). Each second sub-cavity 324 extends longitudinally between another one of the baffles 318 (e.g., baffle 318B) and the one of the septums 316 (e.g., septum 316A). Each second sub-cavity 324 extends laterally between the adjacent pair of the sidewalls 320.

Figure 18:
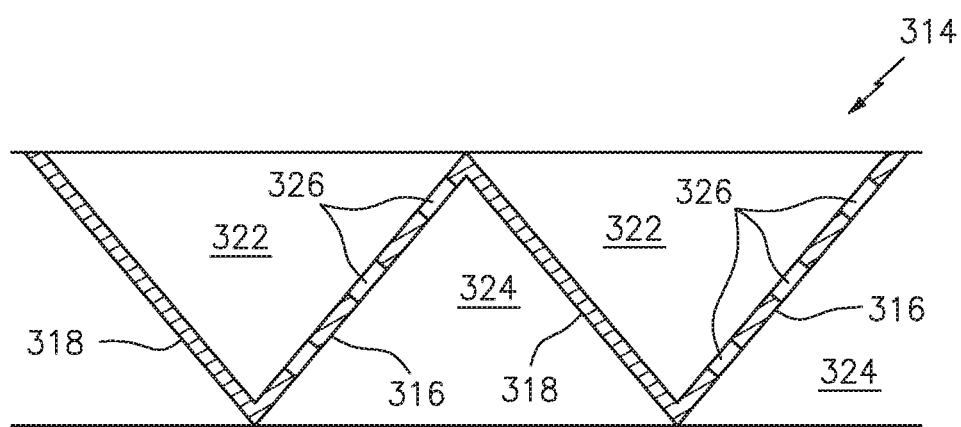
FIG. 18 is a partial sectional illustration of the core structure following a step of perforating septums of the core structure, in accordance with various embodiments.

In step 126, one or more perforations 326 are formed in each of the septums 316. As shown in FIG. 18, these perforation(s) 326 are operable to fluidly couple each of the first sub-cavities 322 to a respective one of the second sub-cavities 324. The perforations 326 may be formed using various techniques including, but not limited to, laser machining and drilling.

Figure 19:
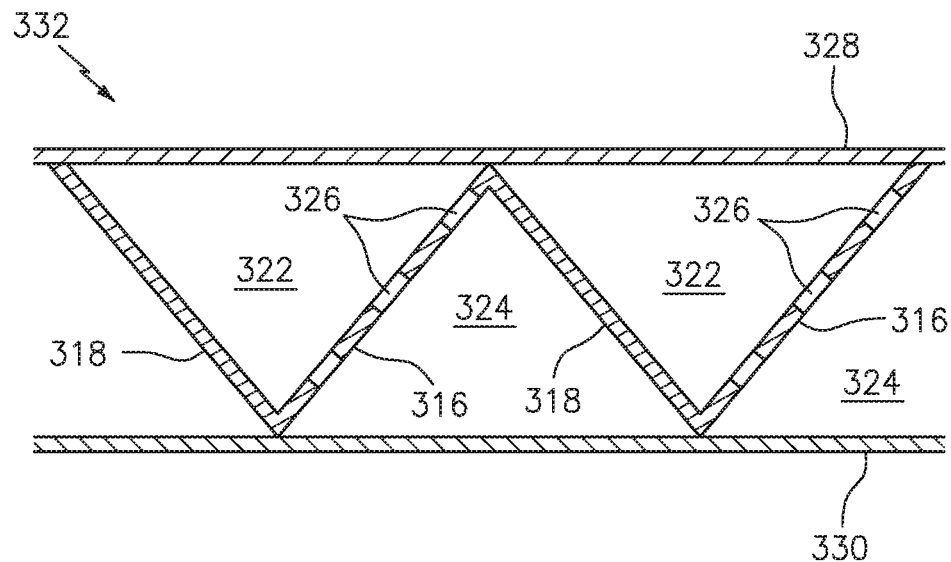
FIG. 19 is a partial sectional illustration of the core structure bonded between a first skin and a second skin, in accordance with various embodiments.

In step 128, the core structure 314 is arranged between and bonded to a first (e.g., top) skin 328 and a second (e.g., bottom) skin 330 to provide a panel 332 as shown in FIG. 19. The first skin 328 vertically bounds the first sub-cavities 322 and the second skin 330 vertically bounds the second sub-cavities 324. Each of the skins 328, 330 may be made from fiber-reinforced composite material, which may be the same or different than the material of the core structure 314. Alternatively, one or both of the skins 328, 330 may be made from another material such as, but not limited to, metal; e.g., sheet metal.

Figure 20:
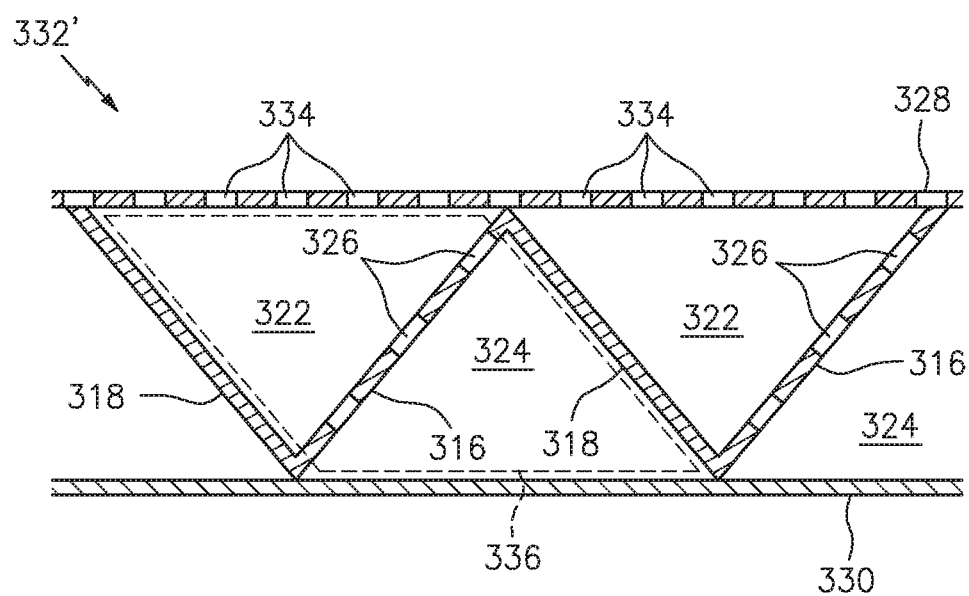
FIG. 20 is a partial sectional illustration of the core structure between the first skin and the second skin following a step of perforating the first skin, in accordance with various embodiments.

In step 130, one or more perforations 334 are formed in the first skin 328. The perforations 334 may be formed using various techniques including, but not limited to, laser machining and drilling. As shown in FIG. 20, these perforation(s) are operable to fluidly couple the first sub-cavities 322 to an ambient environment outside of the panel 332. Of course, were the first skin 328 is made from a material such as metal, the perforations 334 may be formed therein before the step 128 is performed.

The panel 332' shown in FIG. 20 is configured as an acoustic panel. In particular, each of the first sub-cavities 322 is fluidly coupled between the outside environment and a respective one of the second sub-cavities 324 and thereby form a resonance chamber 336. This resonance chamber 336 is operable to attenuate one or more frequencies of noise; e.g., sound waves. For example, each resonance chamber 336 may receive sound waves through the perforations in the first skin 328. The resonance chamber 336 may reverse the phase of one or more frequencies of those sound waves using known acoustic reflection principles and subsequently direct the reverse phase sound waves out of the acoustic panel through the perforations 334 to destructively interfere with other incoming noise waves.

Figure 21:
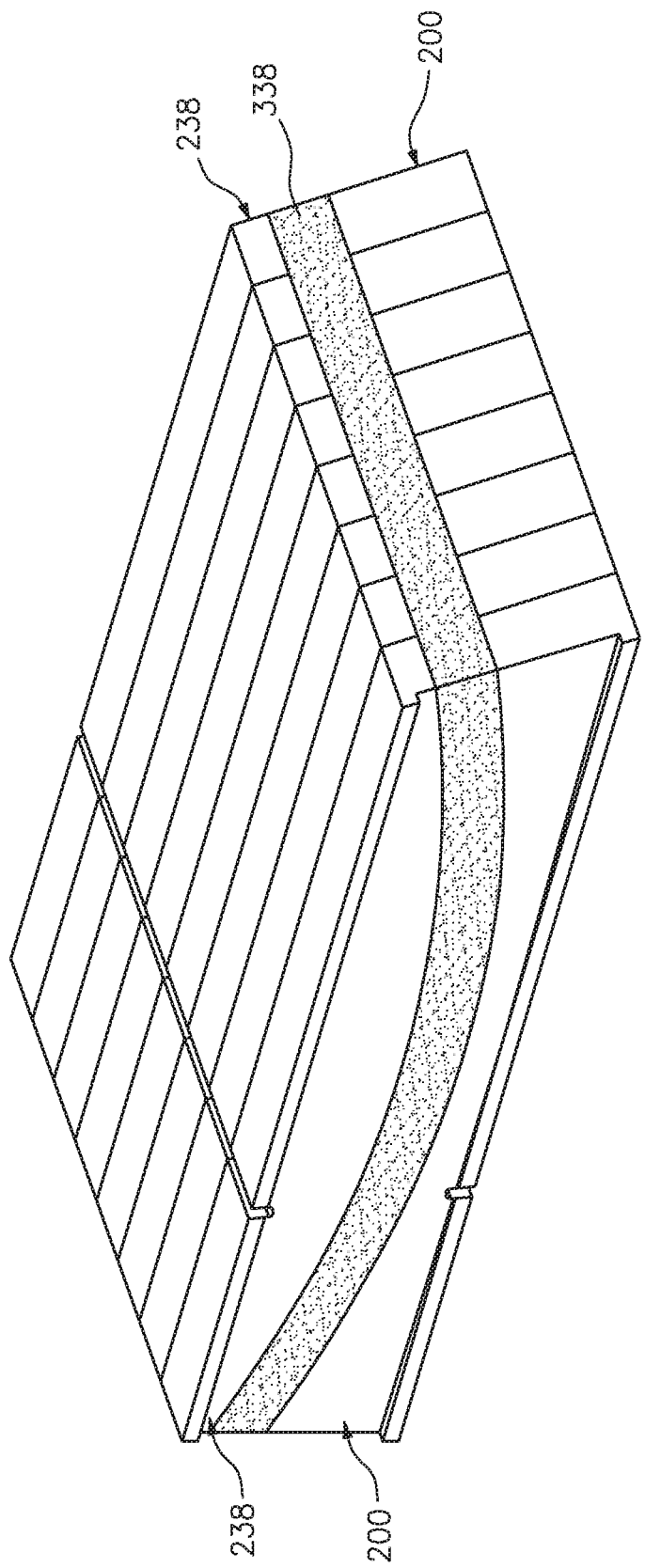
FIG. 21 is a perspective illustration of the mated first and second mandrels wrapped with a perimeter ply of fibrous material, in accordance with various embodiments.

The method 100 may have include other steps than those described above. For example, in some embodiments, at least one perimeter ply 338 of fibrous material may be wrapped around the set of mandrels 200 and 238 as shown in FIG. 21. In addition or alternatively, at least one perimeter ply of fibrous material may be wrapped around a subset of the mandrels 200 and 238. The fibrous material may be the same type as (or a different type than) the ribbon ply/sidewall ply material.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A process for manufacturing a composite structure, comprising:
   providing a plurality of first mandrels, each of the first mandrels comprising a base and a plurality of projections arranged longitudinally along and projecting vertically out from the base;
   providing a plurality of second mandrels;
   providing a plurality of first ribbon plies, each of the first ribbon plies comprising a sheet of fibrous material;
   arranging each of the first ribbon plies with a respective one of the first mandrels, the arranging of each of the first ribbon plies comprising substantially covering each surface of each of the projections of one of the first mandrels with a respective one of the first ribbon plies;
   mating each of the second mandrels with a respective one of the first mandrels such that each of the first ribbon plies is sandwiched between a respective one of the first mandrels and a respective one of the second mandrels; and curing resin disposed with the first ribbon plies to consolidate the first ribbon plies together and form a fiber-reinforced composite core structure of an acoustic panel.

2. The process of claim 1, wherein the respective one of the first ribbon plies substantially covers each surface of each of the projections of the one of the first mandrels without any portion of the respective one of the first ribbon plies overlapping another portion of the respective one of the first ribbon plies.

3. The process of claim 1, further comprising:
providing a plurality of second ribbon plies, each of the second ribbon plies comprising a sheet of fibrous material; and
arranging each of the second ribbon plies with a respective one of the second mandrels;
wherein each of the second mandrels comprises a second base and a plurality of second projections arranged longitudinally along and projecting vertically out from the second base;
wherein the arranging of each of the second ribbon plies comprises substantially covering each surface of each of the second projections of one of the second mandrels with a respective one of the second ribbon plies;
wherein each of the second ribbon plies and a respective one of the first ribbon plies are sandwiched between a respective one of the first mandrels and a respective one of the second mandrels during the mating;
wherein the resin is further disposed with the second ribbon plies; and
wherein the curing of the resin consolidates the second ribbon plies with the first ribbon plies.

4. The process of claim 1, further comprising:
providing a plurality of sidewall plies, each of the sidewall plies comprising a sheet of fibrous material; and
arranging at least one of the sidewall plies between each adjacent pair of the first mandrels;
wherein the resin is further disposed with the sidewall plies; and
wherein the curing of the resin consolidates the sidewall plies with the first ribbon plies.

5. The process of claim 4, wherein the sidewall plies comprises a plurality of first sidewall plies and a plurality of second sidewall plies, and the process further comprises:
arranging each of the first sidewall plies on a first side of each of the first mandrels such that each of the first sidewall plies is abutted against and overlaps a first side portion of a respective one of the first ribbon plies; and
arranging each of the second sidewall plies on a second side of each of the first mandrels such that each of the second sidewall plies is abutted against and overlaps a second side portion of a respective one of the first ribbon plies.

6. The process of claim 4, wherein
each of the first mandrels is configured with a first shelf formed by a first side edge surface of the base and first sides of the projections; and
the first shelf of each of the first mandrels receives a respective one of the sidewall plies.

7. The process of claim 6, wherein
each of the first mandrels is further configured with a second shelf formed by a second side edge surface of the base and second sides of the projections; and
the second shelf of each of the first mandrels receives a respective one of the sidewall plies.

8. The process of claim 1, further comprising:
providing a perimeter ply comprising a sheet of fibrous material; and
wrapping the perimeter ply around a periphery of at least two of the first mandrels;
wherein the resin is further disposed with the perimeter ply; and
wherein the curing of the resin consolidates the perimeter ply with the first ribbon plies.

9. The process of claim 1, wherein the projections of one of the first mandrels are arranged longitudinally along a non-straight longitudinal axis.

10. The process of claim 1, wherein at least one of the projections of the one of the first mandrels is configured as a wedge-shaped projection.

11. The process of claim 1, wherein at least one of the projections of the one of the first mandrels is configured with a triangular sectional geometry.

12. The process of claim 1, wherein
the respective one of the first ribbon plies comprises a plurality of first tabs, a plurality of second tabs and a base laterally between the first tabs and the second tabs; and
each of the first tabs is longitudinally aligned with a respective one of the second tabs.

13. The process of claim 12, wherein one of the first tabs and a respective one of the second tabs that is longitudinally aligned with the one of the first tabs each have a triangular shape.

14. The process of claim 12, wherein a first adjacent pair of the first tabs is separated by a longitudinal distance.

15. The process of claim 12, wherein the respective one of the first ribbon plies further comprises a generally hexagonal shaped portion disposed at a longitudinal end of the base.

16. The process of claim 1, wherein the fiber-reinforced composite core structure comprises a plurality of septums, and the process further comprises forming one or more perforations in each of the septums.

17. The process of claim 16, wherein
the fiber-reinforced composite core structure further comprises a plurality of baffles and a plurality of sidewalls;
a first sub-cavity is formed longitudinally between a first of the baffles and a first of the septums, and laterally between a first of the sidewalls and a second of the sidewalls;
a second sub-cavity is formed longitudinally between a second of the baffles and the first of the septums, and laterally between the first of the sidewalls and the second of the sidewalls; and
the first sub-cavity is fluidly coupled with the second sub-cavity by the one or more perforations in the first of the septums.

18. The process of claim 17, further comprising:
arranging the fiber-reinforced composite core structure between a first skin and a second skin; and
bonding the fiber-reinforced composite core structure to the first skin and the second skin;
wherein each of the septums, each of the baffles and each of the sidewalls extends vertically between the first skin and the second skin.

19. The process of claim 18, further comprising forming a plurality of perforations in the first skin, wherein one or more of the perforations in the first skin are fluidly coupled with the first sub-cavity.

20. A process for manufacturing a composite structure, comprising:
- providing a plurality of first mandrels, each of the first mandrels comprising a plurality of projections that form a longitudinally extending corrugated surface;
- providing a plurality of second mandrels;
- providing a plurality of first ribbon plies, each of the first ribbon plies comprising a sheet of fibrous material, and one of the first ribbon plies comprising a plurality of first tabs, a plurality of second tabs and a base laterally between the first tabs and the second tabs, wherein each of the first tabs is longitudinally aligned with a respective one of the second tabs;
- arranging each of the first ribbon plies with a respective one of the first mandrels, the arranging of each of the first ribbon plies comprising
    - covering the corrugated surface of one of the first mandrels with the base;
    - covering a first side surface of each of the projections of the one of the first mandrels with a respective one of the first tabs; and
    - covering a second side surface of each of the projections of the one of the first mandrels with a respective one of the second tabs;
- mating each of the second mandrels with a respective one of the first mandrels such that each of the first ribbon plies is between a respective one of the first mandrels and a respective one of the second mandrels; and
- curing resin disposed with the first ribbon plies to consolidate the first ribbon plies together and form a fiber-reinforced composite core structure.

* * * * *